(12) United States Patent
Murakami et al.

(10) Patent No.: US 7,652,702 B2
(45) Date of Patent: Jan. 26, 2010

(54) SOLID STATE IMAGING DEVICE AND IMAGING DEVICE

(75) Inventors: Masashi Murakami, Kyoto (JP); Masayuki Hirota, Kyoto (JP); Kenji Watanabe, Kyoto (JP)

(73) Assignee: Panasonic Corporation, Osaka (JP)

( * ) Notice: Subject to any disclaimer, the term of this patent is extended or adjusted under 35 U.S.C. 154(b) by 496 days.

(21) Appl. No.: 11/783,643

(22) Filed: Apr. 11, 2007

(65) Prior Publication Data

US 2008/0030595 A1 Feb. 7, 2008

(30) Foreign Application Priority Data

Aug. 1, 2006 (JP) ............................. 2006-209519

(51) Int. Cl.
*H04N 3/14* (2006.01)
(52) U.S. Cl. ..................... 348/294; 348/302; 250/208.1
(58) Field of Classification Search .............. 250/208.1; 348/241, 255, 294, 300, 301, 308
See application file for complete search history.

(56) References Cited

U.S. PATENT DOCUMENTS 7,141,775 B2* 11/2006 Koseki .................... 250/208.1
7,557,848 B2* 7/2009 Koyama .................... 348/308
2005/0161712 A1* 7/2005 Koyama et al. ............. 257/292

FOREIGN PATENT DOCUMENTS

JP 5-207220 8/1993
JP 2005-252529 9/2005

* cited by examiner

*Primary Examiner*—Lin Ye
*Assistant Examiner*—Temitope Adeyiga
(74) *Attorney, Agent, or Firm*—McDermott Will & Emery LLP

(57) ABSTRACT

A solid state imaging device includes a plurality of pixels arranged in a matrix, a plurality of vertical signal lines VL arranged to correspond to columns of the pixels, respectively, such that each of them is connected to the pixels in each column and a column amplifier including a plurality of amplifiers AP. Each of the amplifiers AP includes a current source MOS transistor T1, an amplifying MOS transistor T2 for amplifying an image signal and a cascode MOS transistor T3 which is cascode-connected to the amplifying MOS transistor and outputs an amplified image signal between the cascode MOS transistor T3 and the current source MOS transistor T1. Gate terminals of the cascode MOS transistors T3 of the amplifiers AP are connected to each other.

23 Claims, 11 Drawing Sheets

SOLID STATE IMAGING DEVICE AND IMAGING DEVICE

BACKGROUND OF THE INVENTION

1. Field of the Invention

The present invention relates to a solid state imaging device and a method for reading image signals out of the solid state imaging device.

2. Description of Related Art

Various methods for reading image signals of CMOS image sensors have recently been proposed. Generally, in a CMOS image sensor of a column-parallel output mode, a row of pixels is selected from a pixel array and signals generated by the pixels are read simultaneously in a column direction.

In the CMOS image sensor of the column-parallel output mode, circuits for various reading modes are used, such as a circuit which reads pixel output by sampling it with a switched capacitor, a circuit including amplifiers arranged on a column to column basis and a circuit including AD converters on a column to column basis.

Among them, an example of the conventional CMOS image sensor disclosed by Japanese Unexamined Patent Publication No. 2005-252529 including the amplifiers on a column to column basis is explained with reference to FIG. 11.

FIG. 11 is a block diagram illustrating a major part of the conventional solid state imaging device. Referring to FIG. 11, light from a subject enters a pixel array 101 through a lens system (not shown). The pixel array 101 is a CMOS sensor array and includes a plurality of pixels GS arranged in a matrix. Each of the pixels GS has a MOS transistor and a photodiode.

A vertical scanning circuit 103 selects and scans a row of the pixel array 101 according to an address and a control signal given by a timing generator 102. The conventional vertical scanning circuit 103 successively scans the rows of the array to read signals from the pixels in an effective region in a column-parallel mode. For this operation, the vertical scanning circuit 103 drives vertical scanning lines L1 to Ln. As shown in FIG. 8, each of the pixels GS includes a photodiode PD, a reset transistor Trst connected to a power source signal line 151 and controlled by a reset signal line 153, an amplifying transistor Tg connected to a vertical output signal line 161 and a readout transistor Ts controlled by a readout signal line 155 (first configuration). The pixel GS may further include a transfer gate Tt in addition to the photodiode PD, the reset transistor Trst, the amplifying transistor Tg and the readout transistor Ts (second configuration).

In FIG. 11, each of the vertical scanning lines L corresponds to the pixels GS in each row. If the pixels GS are those of the first configuration, each of the vertical scanning lines L also functions as a signal line for supplying pulses φR and φSV. On the other hand, if the pixels GS are those of the second configuration, each of the single vertical scanning lines L also functions as a signal line for supplying pulses φR, φSV and φTX. In order to read the pixels in the column-parallel mode, signal charges from the pixels GS arranged in the row direction in the pixel array 101 are simultaneously read and supplied to the vertical signal lines VL (VL1, VL2, ...).

The image signals from the pixels GS of the selected row are read for a horizontal blanking period in a single horizontal scanning period. That is, during the horizontal blanking period, the image signals from the pixels GS of the row selected by the vertical scanning circuit 103 are output in a parallel manner to the vertical signal lines VL1, VL2, ..., respectively.

The image signals transferred from the pixel array 101 to the vertical signal lines VL are processed by the column amplifier 105. The column amplifier 105 includes amplifiers AP, limiters LM and switches SW which are arranged to correspond to the vertical signal lines VL (to the pixel columns), respectively.

With the provision of the amplifiers AP, CDS (correlated double sampling) circuits for sampling the image signals are formed.

The image signals are read in a parallel manner from the pixels of the row selected in the horizontal blanking period and then sampled by the column amplifier 105. As a horizontal scanning circuit 106 sequentially selects the switches SW in a horizontal transfer period of a horizontal period, the sampled image signals are transferred to a horizontal signal line HL and then supplied to an output circuit 104.

The horizontal signal line HL may be made of three horizontal signal lines HL1, HL2 and HL3. The amplifiers AP (and the limiters LM) are connected to the three horizontal signal lines LH1, LH2 and LH3 via the switches SW, respectively. The amplifiers AP corresponding to the pixel columns, respectively, sequentially activate the horizontal signal lines HL1, HL2 and HL3 to perform the horizontal transfer of the signals. The signals transferred through the horizontal signal lines HL1, HL2 and HL3 (outputs of the amplifiers AP) are sequentially selected by a multiplexer MPX, thereby supplying a single line signal to the output circuit 104.

The output circuit 104 performs, for example, AGC (auto gain control) processing and clamp processing, to obtain image signals for a single horizontal scanning period as serial signals. The output circuit 104 further performs A/D conversion to obtain image signals as digital data. Digital gain processing and white balance processing are also executed as digital signal processing.

The image signal which is output from the output circuit 104 after the processing is subjected to signal processing for image display in a display unit or to encoding processing such as formatting and compression to be recorded in a recording medium. Or alternatively, the image signal is sent and output.

The timing generator 102 controls the timings to operate the vertical scanning circuit 103, the horizontal scanning circuit 106, the column amplifier 105 and the output circuit 4. The timing generator 102 controls the timings based on a vertical sync signal and a horizontal sync signal.

According to the conventional column amplifier 105 configured as described above, with the provision of the limiters LM, the current values of the amplifiers AP are ideally kept constant at all times irrespective of the magnitude of the image signals (light intensity) and the gains of the amplifiers AP (C1/C2). Therefore, in a theoretical sense, the power supply level and the ground level are always kept constant even in the presence of parasitic resistance. This makes it possible to avoid problems, such as change in black level and transverse band. Japanese Unexamined Patent Publication No. 2005-252529 further discloses that the amplifier gain is increased by adding cascode MOS transistors to source-grounded amplifiers.

As another example of the solid state imaging device including the amplifiers (e.g., single-end amplifiers) arranged on a column to column basis, Japanese Unexamined Patent Publication No. H5-207220 discloses single-end amplifiers including current source MOS transistors and amplifying MOS transistors.

SUMMARY OF THE INVENTION

According to the configuration disclosed by Japanese Unexamined Patent Publication No. H5-207220 including the amplifiers arranged to correspond to the pixel columns, respectively; offset voltage is removed from the pixels to extract only the signal components easily. Further, the readout gain is controlled as required by the capacity ratio of the capacitors. However, since the amplifiers are those of source-grounded type as shown in FIG. 9, there is a first problem of low gain.

A possible means to improve the gain is to add the cascode transistors to the source-grounded amplifiers according to the technique disclosed by Japanese Unexamined Patent Publication No. 2005-252529. In this case, however, additional transistors and current source are required to control the cascode transistors as shown in FIG. 10. This brings about a second problem of increase in the number of constituents of the circuit and the number of wiring lines between the constituents.

For the above reason, the present invention is intended to provide a solid state imaging device and an imaging device including a column amplifier capable of achieving high gain and reducing the numbers of the constituents and the wiring lines.

The solid state imaging device of the present invention includes: a plurality of pixels arranged in a two-dimensional matrix; a plurality of vertical signal lines arranged to correspond to columns of the pixels, respectively, each of which being connected to the pixels in each column, a plurality of amplifiers arranged to correspond to the vertical signal lines, respectively, each of which including a current source MOS transistor, an amplifying MOS transistor for amplifying image signals output from the pixels to one of the vertical signal lines and a cascode MOS transistor which is cascode-connected to the amplifying MOS transistor between the current source MOS transistor and the amplifying MOS transistor and outputs the amplified image signals between the cascode MOS transistor and the current source MOS transistor, wherein gate terminals of the cascode MOS transistors of the plurality of amplifiers are connected to each other.

With this configuration, the cascode MOS transistors are connected to the amplifying MOS transistors. This makes it possible to improve the gain of the amplifiers. Further, as the gate terminals of the cascode MOS transistors of the amplifiers corresponding to the pixel columns, respectively, are connected to each other, there is no need of extending gate wiring lines for controlling the operation of the cascode MOS transistors in the column direction. As a result, the wiring lines are arranged easily even if the pixels and lines in the pixel array are arranged at a finer pitch.

If the cascode MOS transistors are operated in a strong conversion state, variations in output of the column amplifier are further reduced.

The solid state imaging device of the present invention preferably includes a first control circuit for controlling the operation of the cascode MOS transistors. The first control circuit may be controlled by signals output by a control pulse generating unit such as a timing generator. The control pulse generating unit may be provided inside the solid state imaging device, or alternatively, it may be arranged outside the solid state imaging device and inside an imaging device described later.

An imaging device of the present invention includes: a plurality of pixels arranged in a two-dimensional matrix and receive light; a plurality of vertical signal lines arranged to correspond to columns of the pixels, respectively, each of which being connected to the pixels in each column, a plurality of amplifiers arranged to correspond to the vertical signal lines, respectively, each of which including a current source MOS transistor, an amplifying MOS transistor for amplifying image signals output from the pixels to one of the vertical signal lines and a cascode MOS transistor which is cascode-connected to the amplifying MOS transistor between the current source MOS transistor and the amplifying MOS transistor and outputs the amplified image signals between the cascode MOS transistor and the current source MOS transistor, wherein gate terminals of the cascode MOS transistors of the plurality of amplifiers are connected to each other.

Since the cascode MOS transistors are provided in the column amplifier of the solid state imaging device, the gain of the column amplifier is increased. Further, since the gate terminals of the cascode MOS transistors in the amplifiers corresponding to the pixel columns, respectively, are connected to each other, there is no need of extending gate wiring lines for controlling the operation of the cascode MOS transistors in the column direction. This makes it possible to achieve a simple wiring structure and reduction of an area required for wiring, as well as reduction of variations in output voltage among the amplifiers. Moreover, the operation of the cascode MOS transistors is controlled by a single control circuit. Therefore, for example, if the cascode MOS transistors are deactivated while the amplification is not carried out by the column amplifier, the current flow to the column amplifier is stopped to reduce the power consumption. Further, with the provision of the solid state imaging device described above, the imaging device of the present invention is able to provide excellent image output free from vertical lines.

According to the solid state imaging device of the present invention, the gain is improved by the cascode MOS transistors. Further, since the gate terminals of the cascode MOS transistors are connected each other, there is no need of providing a wiring line in the column direction. As a result, the wiring lines are arranged easily even if the pixels in the pixel array are arranged at a finer pitch.

When the cascode MOS transistors are n-channel MOS transistors, the gate voltage of the cascode MOS transistors is set higher than the gate voltage of the amplifying MOS transistors when the amplifiers are reset. On the other hand, when the cascode MOS transistors are p-channel MOS transistors, the gate voltage of the cascode MOS transistors is set lower than the gate voltage of the amplifying MOS transistors when the amplifiers are reset. As a result, the cascode MOS transistors are operated in a strong inversion region and the gain variations among the amplifiers are reduced. Since the gain variations among the amplifiers are reduced, a feedback capacitor which determines the gain of the column amplifier is reduced or eliminated. Thus, the amplifiers are provided with high gain and the layout area of the device is reduced.

If the feedback capacitor is eliminated, the gain of the amplifier depends on the transistors only. Therefore, the column amplifier with reduced gain variations is achieved even by a process utilizing MOS capacitance or a process which is less likely to provide the capacitors with accuracy.

When all the MOS transistors used in the column amplifier are made of n-channel MOS transistors and if the thresholds of the MOS transistors are varied, the thresholds are shifted in the same direction both on the load side and the amplification side. Therefore, the gain is less likely to vary.

As the cascode MOS transistors are connected to each other, the current flowing to every amplifiers is easily controlled by controlling the gate voltage of the cascode MOS transistors.

According to the control pulse generating unit, a timing at which the amplifiers are stopped comes before the start of the horizontal blanking period and a timing at which the amplifiers are actuated comes after the end of the horizontal blanking period. As a result, the current is supplied to the amplifiers only when the amplifiers are operated, thereby reducing the current consumption by the solid state imaging device.

If a control circuit for generating a control pulse for the amplifiers is used as a camera system (imaging device), the current consumed by the solid state imaging device is easily controlled.

Further, since the noise canceling unit for canceling variations in reset voltage among the amplifiers is provided at the stage subsequent to the amplifiers, the offset variation of the amplifiers is eliminated.

If the noise canceling unit includes a capacitor for clamping the output signal of the amplifier, a capacitor for holding the signal from which the noise is canceled and a MOS transistor for clamping a signal holding part to a reference bias power source, the offset variation of the amplifiers is canceled. Further, the number of constituents of the amplifier is reduced and the increase in layout area is prevented.

The noise canceling unit further includes a sample-hold means for sampling and holding the signal held by the signal holding part. The sample-hold means is formed of a MOS transistor arranged between the clamped capacitor and the signal holding part such that the signal held by the sample-hold means is prevented from varying when the current flow to the amplifier is stopped.

DETAILED DESCRIPTION OF THE INVENTION

First Embodiment

Hereinafter, explanation of a solid state imaging device according to a first embodiment of the present invention is provided with reference to the drawings.

Figure 1:
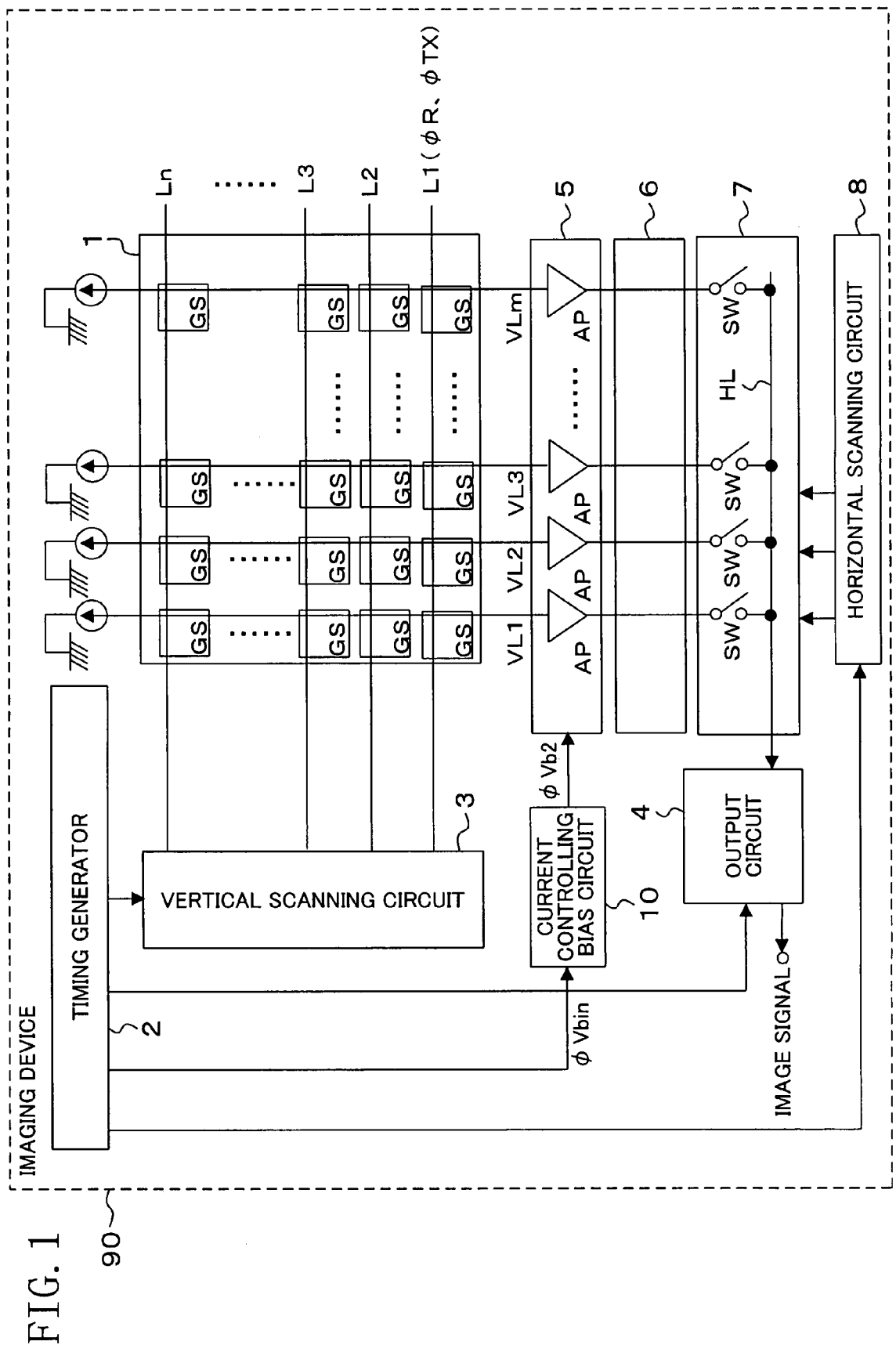
FIG. 1 is a schematic diagram illustrating a solid state imaging device according to a first embodiment of the present invention.
Figure 2:
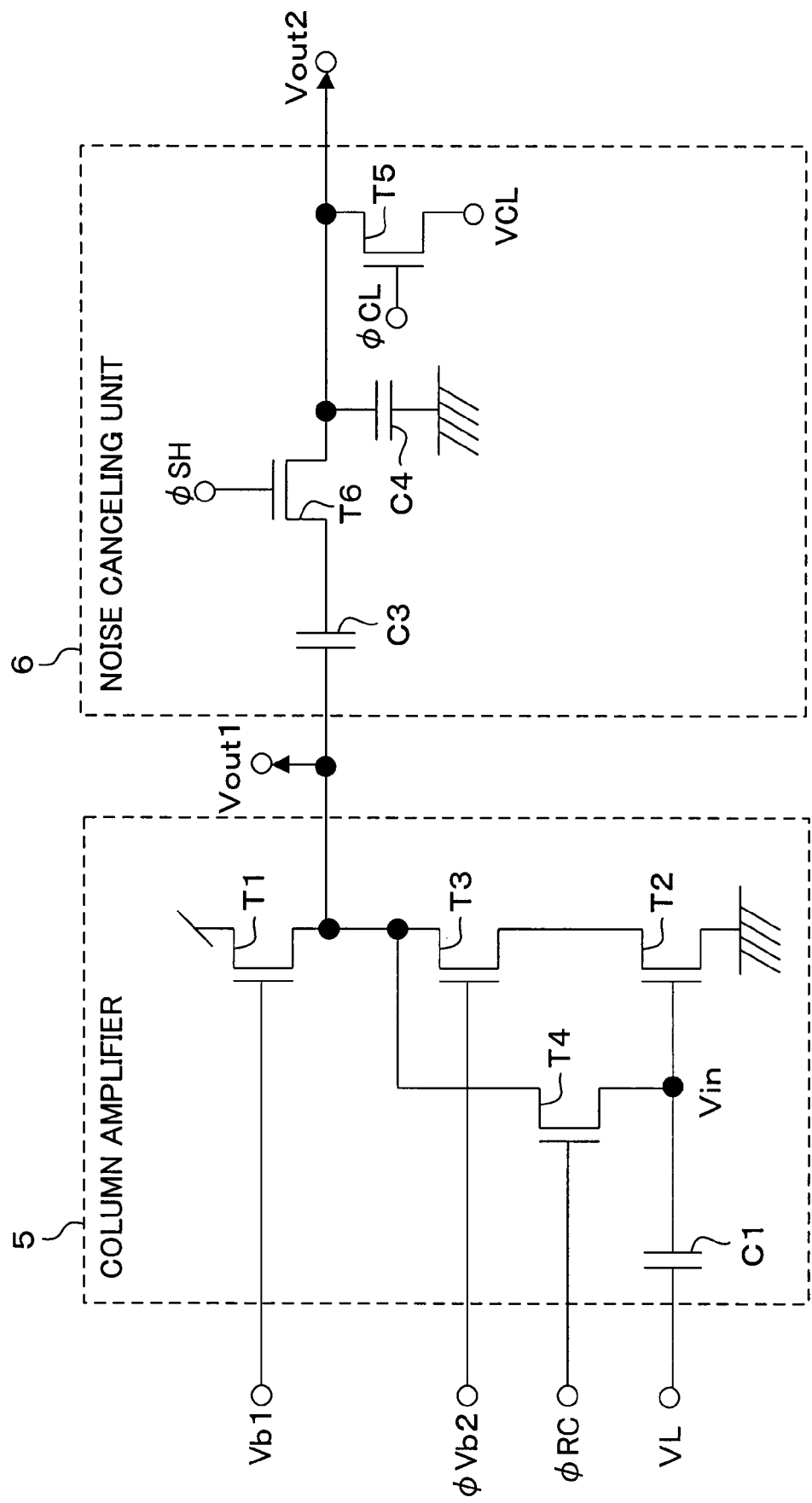
FIG. 2 is a circuit diagram illustrating a column amplifier and a noise canceling unit of the solid state imaging device of the first embodiment.

FIG. 1 is a schematic view illustrating the solid state imaging device of the first embodiment of the present invention. FIG. 2 is a circuit diagram illustrating a column amplifier and a noise canceling unit of the solid state imaging device of the first embodiment. FIG. 2 shows one of amplifiers AP forming the column amplifier and a noise canceling unit, both of which are made of n-channel MOS (MIS) transistors.

As shown in FIG. 1, the solid state imaging device of the first embodiment includes a pixel array 1 including a plurality of pixels GS arranged in a two-dimensional matrix and capable of converting light into an electric signal. The solid state imaging device further includes a plurality of vertical signal lines VL1 to VLm, a plurality of vertical scanning lines L1 to Ln, a vertical scanning circuit 3, a column amplifier 5, a current controlling bias circuit (first control circuit) 10, a noise canceling unit 6, a horizontal readout unit 7, a horizontal scanning circuit 8, an output circuit 4 and a timing generator (control pulse generating unit) 2. The vertical signal lines VL1 to VLm are arranged to correspond to the columns of the pixels GS, respectively, and each of them is connected to the pixels in each column. The vertical scanning lines L1 to Ln are arranged to correspond to the rows of the pixels GS and the vertical scanning circuit 3 drives the vertical scanning lines L1 to Ln. The column amplifier 5 includes a plurality of amplifiers AP connected to the vertical signal lines VL1 to VLm, respectively. The current controlling bias circuit 10 controls the operation of the column amplifier 5. The noise canceling unit 6 cancels noise of output signals (image signals) from the column amplifier 5 and the horizontal readout unit 7 reads out the image signals output from the column amplifier 5. The horizontal scanning circuit 8 controls the output of the image signal from the horizontal readout unit 7 and the output circuit 4 outputs the image signal transferred from the horizontal readout unit 7 to an external circuit. The timing generator 2 controls the operation of the vertical scanning circuit 3, the current controlling bias circuit 10, the output circuit 4 and the horizontal scanning circuit 8.

Light from a subject enters the pixel array 1 through a lens system (not shown). The pixel array 1 is a so-called MOS sensor array.

The vertical scanning circuit 3 selects and scans a row of the pixel array 1 according to an address and a control signal given by the timing generator 2. In the present embodiment, the rows are sequentially scanned for selection to read the pixels in an active area in a column-parallel mode. For this operation, the vertical scanning circuit 3 drives the vertical scanning lines L1 to Ln.

Each of the pixels GS may include a photodiode PD, a reset transistor Trst, an amplifying transistor Tg and a readout transistor Ts (first configuration). Alternatively, each of the pixels GS may further include a transfer gate Tt in addition to the photodiode PD, the reset transistor Trst, the amplifying transistor Tg and the readout transistor Ts (second configuration). In FIG. 1, the vertical scanning lines L are provided in a one-to-one relationship with the rows of the pixels GS. If the pixels GS are those of the first configuration, each of the vertical scanning lines L also functions as a signal line for supplying pulses φR and φSV. On the other hand, if the pixels GS are those of the second configuration, each of the vertical scanning lines L also functions as a signal line for supplying pulses φR, φSV and φTX.

In order to read the pixels in the column-parallel mode, signal charges from the pixels GS arranged in the row direction in the pixel array 1 are simultaneously read out and supplied to the vertical signal lines VL (VL1, VL2, . . . ). More specifically, the vertical scanning circuit 3 activates the vertical scanning line L of a selected row such that signals at a reset level are supplied from the pixels GS of the selected row to the vertical signal lines VL (P-phase reading). Then, the vertical scanning circuit 3 executes an operation for supplying image signals corresponding to the charges stored in the photodiodes PD (not shown) of the pixels GS to the vertical signal lines VL (D-phase reading). The vertical scanning circuit 3 sequentially performs the reading operation on the pixels GS on a row to row basis.

The image signals from the pixels GS of the selected row are read for a horizontal blanking period in a single horizontal scanning period. That is, during the horizontal blanking period, the image signals from the pixels GS of the row selected by the vertical scanning circuit 3 are output in a parallel manner to the vertical signal lines VL1 to VLm connected to the pixels GS, respectively.

The image signals transferred from the pixel array 1 to the vertical signal lines VL are processed by the column amplifier 5. The column amplifier 5 includes amplifiers AP arranged to correspond to the vertical signal lines VL (to the pixel columns), respectively. For example, the amplifiers AP may be capacitative elements, switching elements or charge integrating amplifiers having single-end amplifiers.

The noise canceling unit 6 is a CDS (correlated double sampling) circuit for sampling the image signal. More specifically, a differential between a P-phase reading level (reset level) and a D-phase reading level (data level) is sampled and output as the image signal. This eliminates thermal noise generated in a sampling-and-holding period.

The image signals are read in a parallel manner from the pixels of the selected row and then sampled by the noise canceling unit 6 in the horizontal blanking period. Then, as the horizontal scanning circuit 8 sequentially selects switches SW of the horizontal readout unit 7 in a horizontal transfer period of the horizontal scanning period, the image signals are transferred to a horizontal signal line HL.

The output circuit 4 performs, for example, AGC (auto gain control) processing and clamp processing, to obtain image signals for a single horizontal scanning period as serial signals. The output circuit 4 further performs A/D conversion to obtain image signals as digital data. Digital gain processing and white balance processing are also executed as digital signal processing.

The image signal which is output from the output circuit 4 after the processing is subjected to signal processing for image display in a display unit or to encoding processing such as formatting and compression to be recorded in a recording medium. Or alternatively, the image signal is sent and output. When the signal from a MOS sensor (solid state imaging element) provided in each pixel is analog output, the output circuit 4 may be constituted of an amplifier for impedance conversion only.

The timing generator 2 controls the timings to operate the vertical scanning circuit 3, the horizontal scanning circuit 8, the column amplifier 5, the noise canceling unit 6 and the output circuit 4. The timing generator 2 controls the timings based on a vertical sync signal and a horizontal sync signal. The timing generator 2 may be provided inside the solid state imaging device or outside the solid state imaging device in an imaging device such as a camera system.

Figure 11:
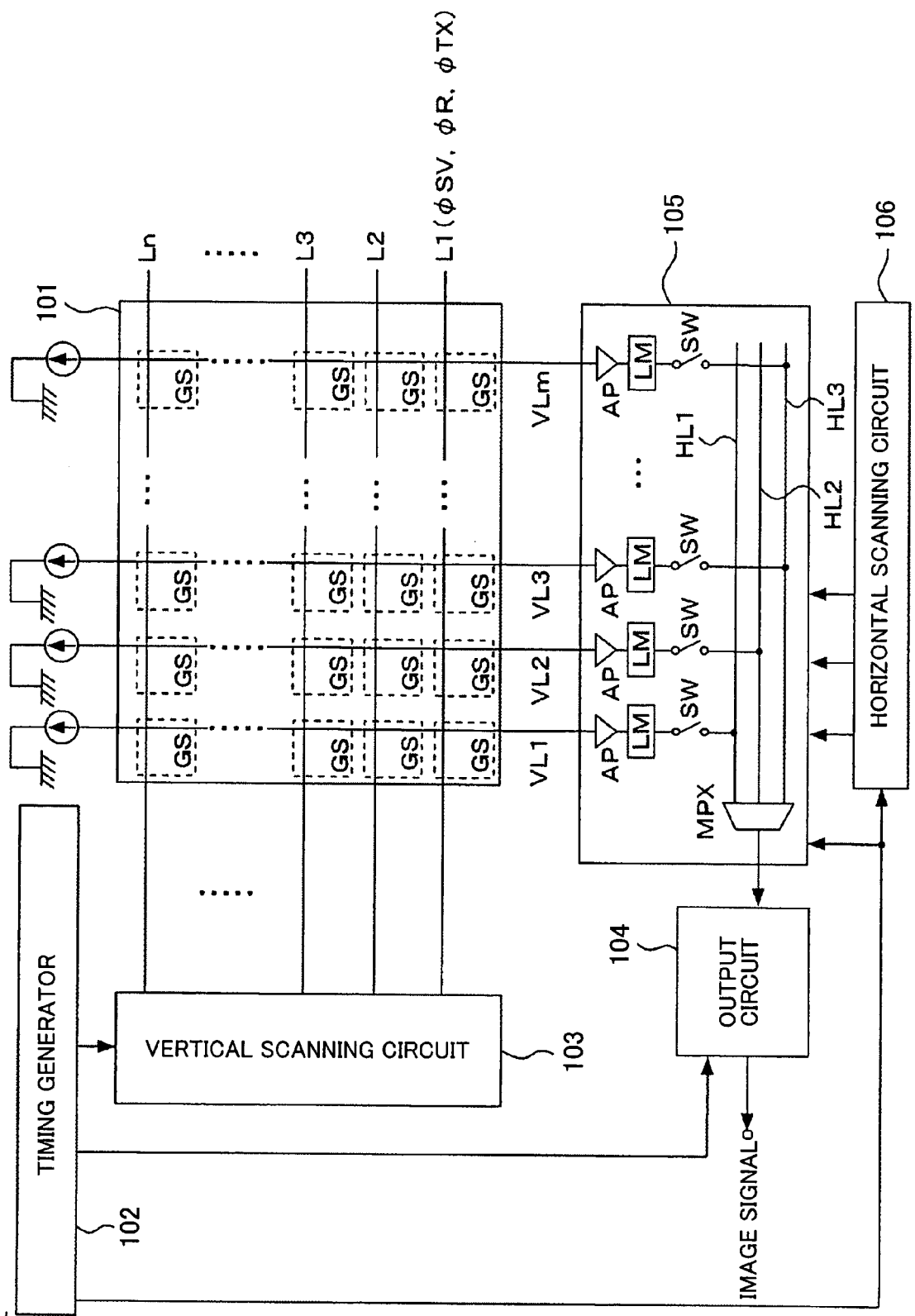
FIG. 11 is a schematic diagram illustrating the conventional solid state imaging device.

As a first characteristic feature of the solid state imaging device according to the first embodiment shown in FIG. 1, gate electrodes (gate terminals) of cascode MOS transistors, which are cascode-connected to amplifying MOS transistors in the column amplifier 5, are connected to each other. Hereinafter, the configuration and operation of the column amplifier 5 and the noise canceling unit 6 are explained with reference to FIG. 2. In the present embodiment, other components of the solid state imaging device than the column amplifier 5, the noise canceling unit 6, the current controlling bias circuit 10 and the timing generator 2 are substantially the same as those of a conventional solid state imaging device shown in FIG. 11.

As shown in FIG. 2, each of the amplifiers AP forming the column amplifier 5 includes an input terminal to which an image signal is input, an output terminal, an amplifying MOS transistor T2 for amplifying the image signal read through the vertical signal line VL, a storage capacitor C1 arranged between a gate electrode of the amplifying MOS transistor T2 and the vertical signal line VL, a current source MOS transistor T1 serving as a current source for the column amplifier 5, a cascode MOS transistor T3 arranged between the amplifying MOS transistor T2 and the current source MOS transistor T1 and cascode-connected to the amplifying MOS transistor T2 and a reset transistor (reset circuit) T4 arranged between the input and output terminals of the column amplifier 5 to reset the operation of the column amplifier 5.

A supply voltage or a voltage higher than the supply voltage is applied to a gate terminal Vb1 of the current source MOS transistor T1.

The storage capacitor C1 is provided to eliminate an offset of the image signal read through the vertical signal line VL. This makes it possible to read out only the amplitude of the image signal to the subsequent stage. However, even if the storage capacitor C1 is not provided, the image signal can be amplified.

The cascode MOS transistor T3 has the effect of improving the gain of the column amplifier 5. Referring to FIGS. 1 and 2, the cascode MOS transistors T3 of the amplifiers AP forming the column amplifier 5 have gate electrodes (gate terminals) electrically connected to each other. That is to say, in the amplifiers AP corresponding to the pixel columns, respectively, the gate terminals of the cascode MOS transistors T3 are connected to a shared gate wiring line.

With this configuration, the gate wiring line for the cascode MOS transistors T3 is extended only in the row direction in the column amplifier 5. That is, there is no need of extending the gate wiring line in the column (vertical) direction. Therefore, even if the pixels in the pixel array are arranged at a finer pitch, the wiring arrangement is easily achieved. More specifically, the wiring arrangement is achieved with a larger line width and a larger gap between the wiring lines. Therefore, the need of forming multilayered wiring lines is minimized.

In order to operate the cascode MOS transistors T3 of the present embodiment, a bias voltage is applied to the gate terminals thereof as φVb2. When a LOW voltage is applied to the gate terminals as φVb2, the cascode MOS transistors T3 are turned OFF and the current flow to the cascode MOS transistors T3 is stopped. Thus, the amount of current consumed by all the amplifiers AP in the column amplifier 5 is easily controlled. To be more specific, since the gate terminals of the cascode MOS transistors T3 corresponding to the pixel columns, respectively, are connected to the shared wiring line, the current consumed by all the amplifiers AP is controlled simultaneously with a single current controlling drive pulse.

The column amplifier 5 shown in FIG. 2 is composed of n-channel MOS transistors only. If the column amplifier 5 is made of CMOS circuits, sufficient current control effect is obtained. However, the current control effect becomes greater when the column amplifier 5 is made of the n-channel MOS transistors only.

For the column amplifier including only the n-channel MOS transistors, it has been general to apply a supply voltage or a voltage higher than the supply voltage to the gate terminals of the MOS transistors on the load side and it has been difficult to control the gate voltage of the MOS transistors on the load side. Therefore, switches are provided to control the operation of the amplifying MOS transistors, but in some cases, this is accompanied by increase in input load capacitance and decrease in gain of the amplifier. In contrast, as to the column amplifier 5 composed of the n-channel MOS transistors only, the current control is achieved more effectively. Even if the thresholds of the MOS transistors are varied, they are shifted in the same direction both on the load side and the amplification side. Therefore, the gain is less likely to vary.

According to the present embodiment, it is preferable that the cascode MOS transistors T3 are operated in a strong inversion region when the column amplifier 5 is operated.

Figure 4:
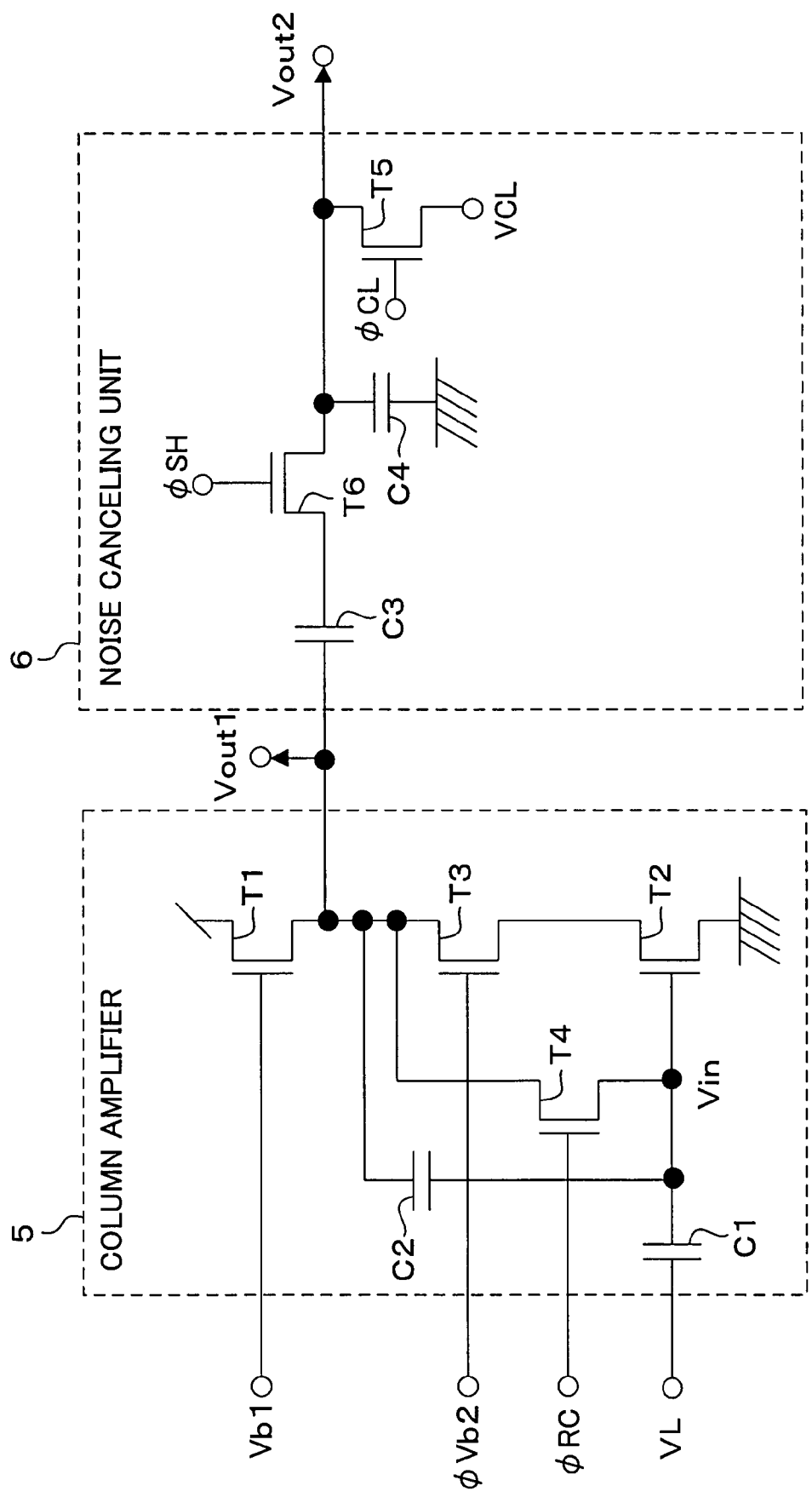
FIG. 4 is a circuit diagram illustrating a column amplifier and a noise canceling unit of a second embodiment of the solid state imaging device.

A reason for the above is described below. In order to achieve the pixel arrangement at a finer pitch, a feedback capacitor C2, which is a constituent of a second embodiment of the present invention described later and shown in FIG. 4, is not provided in each of the amplifiers AP of the column amplifier 5 of FIG. 2. In this case, open loop gain of the column amplifier 5 configured as shown in FIG. 2 will be gm R, wherein gm is a transconductance of the amplifying MOS transistors T2 and R is a resistance of the cascode MOS transistors T3. In general, the size of the current source MOS transistors T1 is increased to raise gm, but this leads to increase in layout area. Further, when the current source MOS transistors Ti are increased in size, the input capacity of the current source MOS transistors T1 is increased and the capacitance of the storage capacitors C1 needs to be increased. This also leads to increase in layout area. Thus, it is difficult to raise gm of the current source MOS transistors T1 if the pixels are arranged at a finer pitch.

In order to increase R, in general, a voltage applied to the gate terminals of the cascode MOS transistors T3 is reduced. If the voltage applied to the gate terminals is reduced, the cascode MOS transistors T3 are operated in a weak inversion region, thereby increasing the resistance R. Further, if the column amplifier 5 is configured such that the gain depends on the capacity ratio and the gain determined by the capacity ratio is set lower than the open loop gain, the gain of the column amplifier is determined by the capacity ratio. However, if the cascode MOS transistors T3 are used in the weak inversion region in the circuit configuration shown in FIG. 2 which makes it possible to arrange the pixels at a finer pitch, the transistor characteristics are significantly varied. As a result, the gains of the amplifiers are varied from each other and image quality may possibly deteriorate as vertical lines are generated in an output image.

In the solid state imaging device of the present embodiment, the cascode MOS transistors T3 are operated in a strong inversion region. Therefore, the transistor characteristics are stabilized, the amplifier gains are less likely to vary and the vertical lines are less likely to occur in the output image. The stabilization of the transistor characteristics of the cascode MOS transistors T3 is to stabilize the ON resistance of the cascode MOS transistors T3.

In order to operate the n-channel cascode MOS transistors T3 in a strong inversion region, it is preferable to establish Vgs>Vt for the cascode MOS transistors T3 (Vgs is a voltage between the gate and the source and Vt is a threshold voltage of the cascode MOS transistor T3).

The reason for the above is described below. What is important for the solid state imaging device are the reduction of the amplitude of the image signal and the prevention of the occurrence of vertical lines when the amplitude of the image signal is reduced. If the cascode MOS transistors T3 hold Vgs>Vt, the gain is increased by gamma correction performed on a dark or low lux part of the image where the signal amplitude is small.

In order to operate the cascode MOS transistors T3 in a strong inversion region with the amplitude of the image signal reduced, gate voltage φRC of the amplifying MOS transistors T2 when the reset transistors T4 are turned ON is preferably set lower than gate voltage φVb2 of the cascode MOS transistors T3. If the cascode MOS transistors T3 are p-channel MOS transistors, it is preferable that the gate voltage φRC of the amplifying MOS transistors T2 when the reset transistors T4 are turned ON is set higher than the gate voltage φVb2 of the cascode MOS transistors T3. As the transistors are controlled in this manner, the gain of the amplifier is less likely to vary. For this reason, the feedback capacitor (C2 shown in FIG. 4) which determines the gain of the column amplifier 5 is eliminated from the solid state imaging device of the present embodiment. As a result, the layout area is reduced in the solid state imaging device of the present embodiment. However, the feedback capacitor C2 with a small capacitance value may be provided as shown in FIG. 4.

Figure 6:
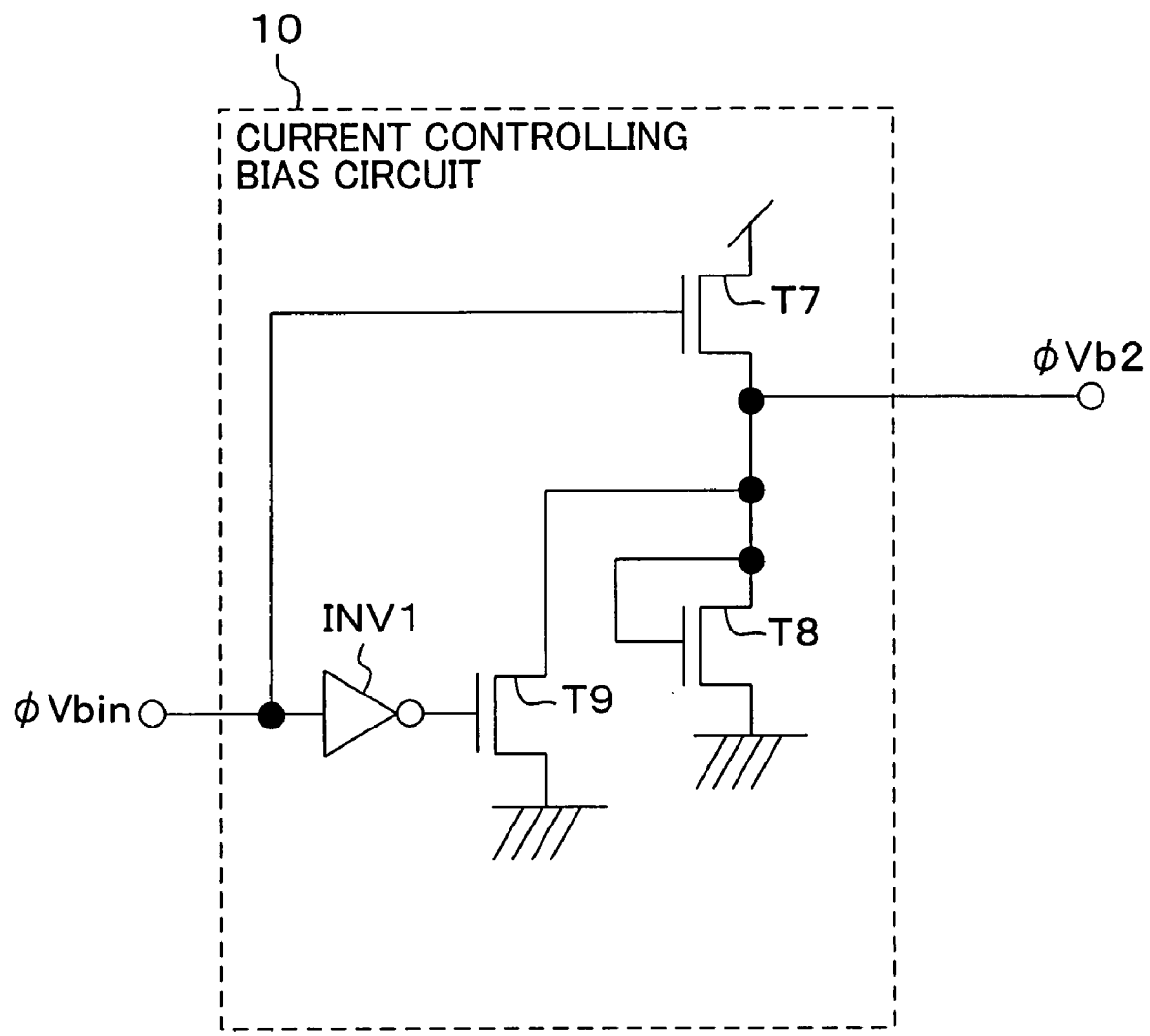
FIG. 6 is a circuit diagram illustrating a current controlling bias circuit of the solid state imaging device of the first embodiment.

Referring to FIG. 6, a control circuit for the cascode MOS transistors T3 is explained in detail. A second characteristic feature of the solid state imaging device of the present embodiment is that the control unit performs ON/OFF control of the current flow to the amplifiers AP by controlling the operation of the cascode MOS transistors T3.

FIG. 6 is a circuit diagram illustrating the structure of a current controlling bias circuit of the solid state imaging device according to the first embodiment.

As shown in FIG. 6, a current controlling bias circuit 10 which outputs a control signal (gate voltage φVb2) for controlling the operation of the cascode MOS transistors T3 includes an inverter element INV1, a reset transistor T9 having a gate electrode connected to the output side of the inverter element INV1, a MOS transistor T7 connected to the input side of the inverter element INV1 and a MOS transistor T8 having a grounded source and a drain connected to its gate electrode, a drain of the MOS transistor T9 and a source of the MOS transistor T7.

In FIG. 6, φVbin is a control signal output from the timing generator 2 shown in FIG. 1. φVbin is a HIGH signal when the amplifiers AP are operated, while it is a LOW signal when the operation of the amplifiers AP is stopped.

The MOS transistors T7 and T8 form a bias circuit for supplying a gate voltage to the cascode MOS transistors when the amplifiers AP are operated. In order to operate the column amplifier 5, φVbin is output as a HIGH signal and the MOS transistor T7 is turned ON, thereby outputting a bias voltage as φVb2 for turning the cascode MOS transistors T3 ON.

The MOS transistor T9 is a transistor for resetting the operation of the bias circuit. When φVbin is LOW, the gate voltage of the MOS transistor T9 is set HIGH by the inverter element INV1, thereby turning the MOS transistor T9 ON. At this time, as the MOS transistor T9 is turned ON, φVb2 is output as a LOW grand voltage. Then, the operation of the column amplifier 5 is stopped.

Thus, the current controlling bias circuit 10 controls the operation of the cascode MOS transistors T3 such that the amplifiers AP are stopped while they do not perform the amplification. Therefore, the amount of current consumed by the column amplifier 5 is reduced.

According to the present embodiment, the cascode MOS transistors in the column amplifier 5 corresponding to the pixel columns, respectively, have the gate terminals connected to each other. Therefore, as shown in FIG. 1, it is not necessary to arrange the bias control circuit for each column and high gain is obtained by providing only a single bias control circuit for all the cascode MOS transistors. Thus, the solid state imaging device of the present embodiment achieves both of high gain and size reduction. This makes it possible to provide a small imaging device with improved performance.

Figure 7:
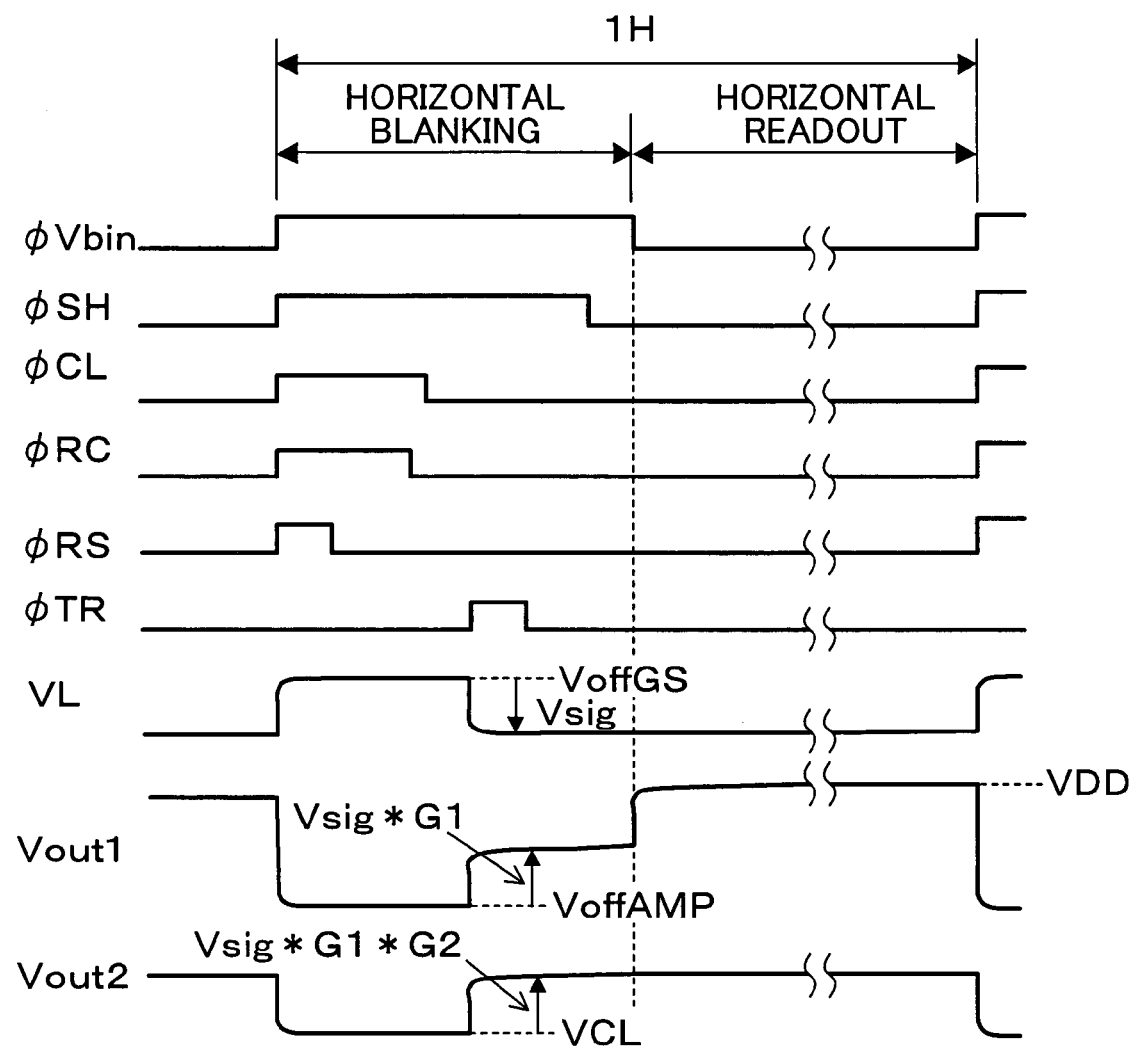
FIG. 7 is a timing chart illustrating signal waveforms at various parts of the solid state imaging device of the first embodiment.

Next, referring to FIGS. 2 and 7, explanation of the noise canceling unit 6 of the solid state imaging device according to the present embodiment is provided in detail.

Figure 8:
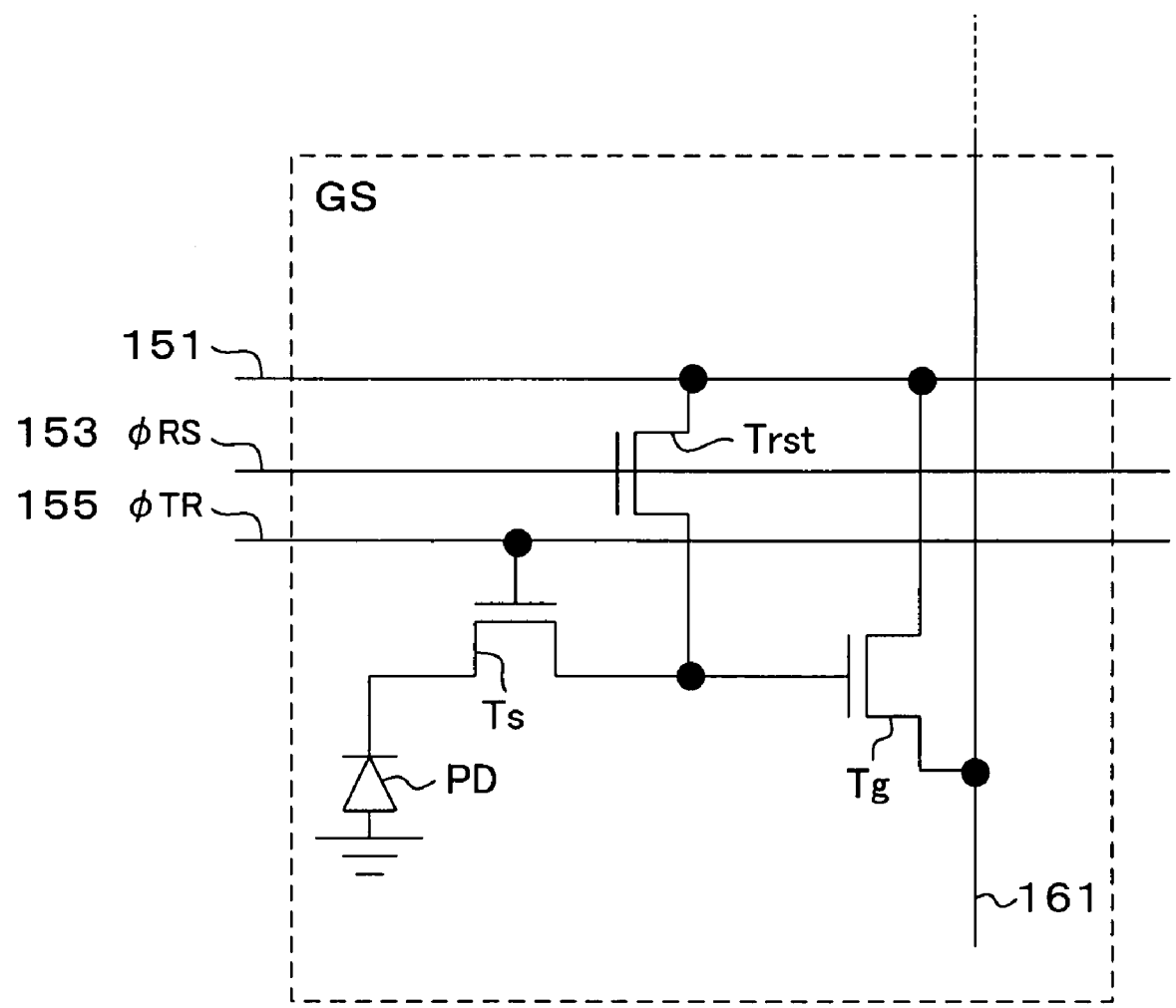
FIG. 8 is a circuit diagram illustrating pixels GS of a conventional solid state imaging device.
Figure 9:
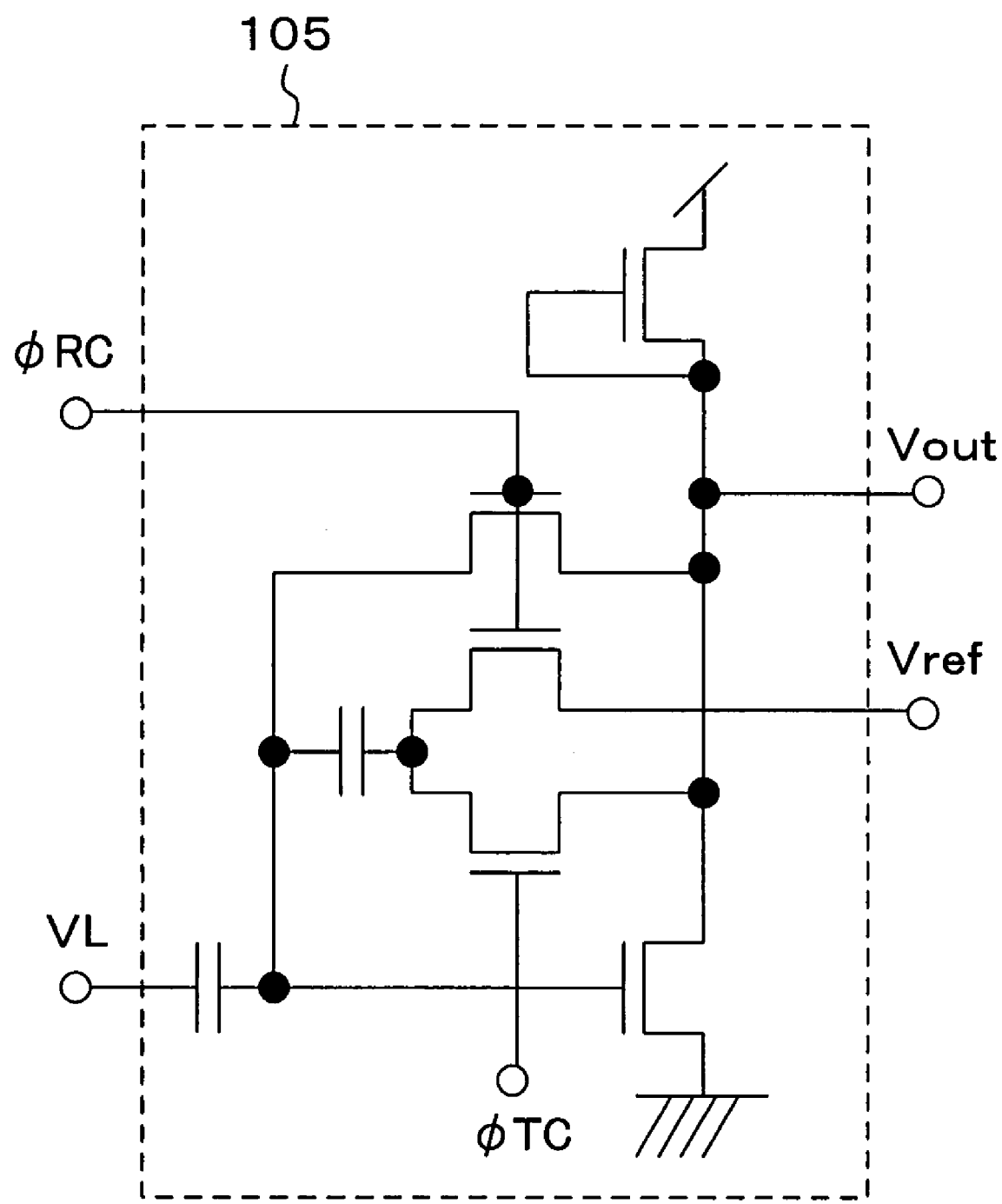
FIG. 9 is a circuit diagram illustrating an example of a column amplifier of the conventional solid state imaging device.
Figure 10:
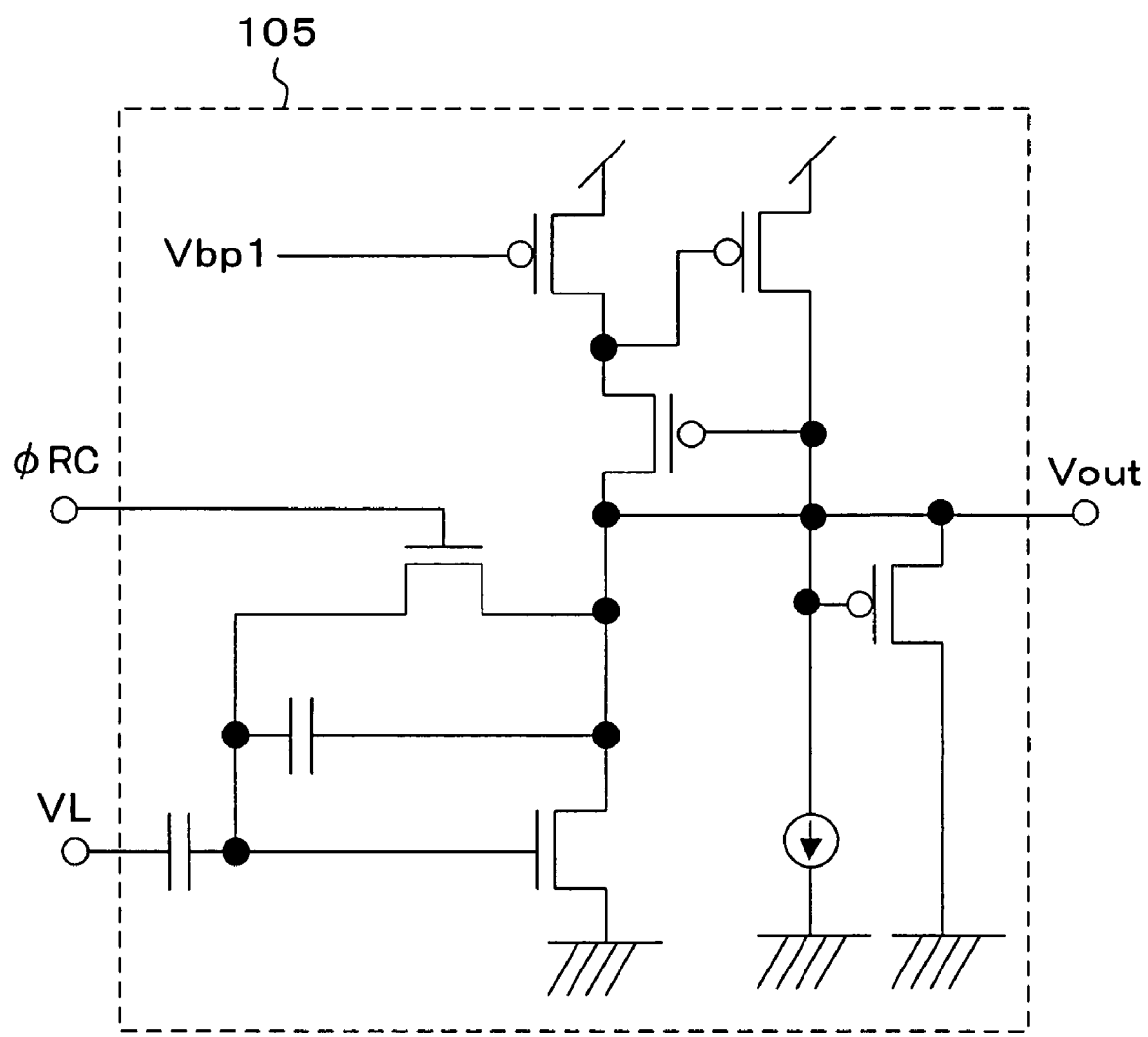
FIG. 10 is a circuit diagram illustrating an example of a column amplifier of the conventional solid state imaging device.

The noise canceling unit 6 shown in FIG. 2 is a circuit for canceling offset variation that occurs in the column amplifier 5 and a pixel reading circuit (a current source arranged above the vertical signal lines VL shown in FIG. 1 and Tg shown in FIG. 8). FIG. 7 is a timing chart illustrating signal waveforms at various parts of the solid state imaging device of the first embodiment. The timing chart of FIG. 7 shows drive pulses in a single horizontal scanning period (hereinafter referred to as 1H).

As shown in FIG. 2, the noise canceling unit 6 includes a capacitor C3 connected to an input terminal of the column amplifier 5 at one end, a sample-hold MOS transistor T6 connected to the other end of the capacitor C3, a capacitor C4 arranged between the sample-hold MOS transistor T6 and ground, an output terminal connected to the sample-hold MOS transistor T6, a voltage source for supplying voltage VCL and a MOS transistor T5 arranged between the voltage source and the output terminal.

The capacitor C3 eliminates an offset contained in an image signal Vout1 output from the amplifiers AP. Then, the capacitor C4 holds the signal from which the offset is eliminated. Then, the transistor T5 clamps the voltage of a signal holding part to the voltage VCL of the voltage source. In this state, a first control circuit (not shown) applies a HIGH signal in the pulse form as φCL before reading the image signal to turn the MOS transistor T5 ON, thereby clamping the voltage of the signal holding part to VCL. The signal holding part is a part between the sample-hold MOS transistor T6 and the output terminal of the noise canceling unit 6. The voltage source for supplying VCL may be connected to all the MOS transistors T5 in the noise canceling unit 6 corresponding to the pixel columns, respectively. The sample-hold MOS transistor T6 functions to keep the signal held in the capacitor C4 for a predetermined period. Immediately after the signal reading, a second control circuit (not shown) supplies a LOW signal in the pulse form as φSH to turn the sample-hold MOS transistor T6 OFF such that the signal held in the signal holding part is protected from the influence of the variations in output when the current flow to the column amplifier is stopped.

Referring to FIG. 7, the noise canceling unit 6 is operated in a different manner within the 1H period between a horizontal blanking period in which the column amplifier is operated to read the image signal and a horizontal readout period in which the signal held after the image signal reading is horizontally read.

The timing of the operation of the noise canceling unit 6 is described below.

As shown in FIG. 7, φRS, φRC and φCL are switched from LOW to HIGH to turn the reset transistor T4 and the MOS transistor T5 ON, thereby resetting the pixels GS and the column amplifier 5 and clamping the noise canceling unit 6.

Then, φRS and φRC are sequentially changed to LOW to turn the reset transistors Trst in the pixels GS and the reset transistors T4 of the column amplifier 5 OFF, thereby terminating the reset operation of the pixels GS and the column amplifier 5. Then, φCL is turned OFF such that the voltage of the vertical signal lines VL becomes the offset voltage VoffGS of the pixels GS and the voltage Vout1 of the output terminal of the column amplifier 5 becomes VoffAMP. The voltage Vout2 of the signal holding part of the noise canceling unit 6 becomes VCL.

Then, when φTR becomes HIGH and the signal Vsig of the pixels GS is read through the vertical signal line, a change in signal amplitude, which is a product obtained by Vsig×G1×G2 (G1 is the gain of the column amplifier and G2 is the gain of the noise canceling unit 6, G2=C1/(C1+C2)), appears at the signal holding part. Then, the voltage of the output signal of the noise canceling unit 6 becomes VCL+Vsig×G1×G2.

As a characteristic feature of the solid state imaging device of the first embodiment, the offset voltage VoffGS of the pixels GS and the offset voltage VoffAMP of the column amplifier 5 are not read out in the noise canceling unit 6. Accordingly, the signal held by the sampling part is clamped to VCL. Since VL is a common voltage for every column, the occurrence of the offset in each column is prevented.

Subsequently, a sample hold pulse φSH becomes LOW and the sample-hold MOS transistor T6 is turned OFF. Thereafter, the current control pulse φVbin becomes OFF.

Through the processing described above, the operation of the column amplifier 5 in the solid state imaging device of the present embodiment is stopped, thereby saving the current consumed by the column amplifier 5.

When φVbin is turned OFF, the output Vout1 of the column amplifier 5 becomes a supply voltage VDD. At this time, φSH is LOW and the sample-hold MOS transistor T6 is in the OFF state. Therefore, the output variation of the column amplifier 5 is not transmitted to the signal holding part.

According to the above-described circuit configuration and the control by the circuit of the present embodiment, the column amplifier 5 is activated only for the horizontal blanking period in which the column amplifier 5 performs the amplification. Therefore, the current consumption by the column amplifier 5 is reduced.

Further, the solid state imaging device of the present embodiment makes it possible to cancel the offset of the pixels GS and the column amplifier 5 in the reset operation, as well as the offset variation caused by the termination of the current flow to the column amplifier 5 from the output signal Vout2 of the noise canceling unit 6. In addition, since the gain G2 of the noise canceling unit 6 is G2=C1/(C1+C2), the gain variation is reduced when C1>C2 is established, even if the capacitors are formed with low accuracy. C1 and C2 indicate capacitance values of the storage capacitor C1 and the feedback capacitor C2, respectively.

If a conventional CMOS image sensor is configured with a finer pixel pitch and the amplifiers AP are arranged to correspond to the pixel columns, respectively, the layout area is increased when the number of the constituents of the amplifiers AP is increased. In the solid state imaging device of the present embodiment, however, the gate terminals of the cascode MOS transistors in the column amplifier 5 are connected to each other and the voltage applied to the gate terminals is controlled. As a result, the increase in layout area is reduced and the amount of current consumed by the amplifiers AP is reduced as compared with the case where a control circuit is provided for each of the gate terminals of the amplifiers AP.

Further, in the conventional CMOS image sensor, when the number of the constituents increases and the number of the wiring lines between the constituents increases, it becomes difficult to arrange the wiring lines among the dense pixel array and the wiring lines must be multilayered. This may possibly cause image degradation in the conventional CMOS image sensor, such as reduction in sensitivity and deterioration of angle of incidence.

In contrast, according to the present embodiment, the operation of the cascode MOS transistors of the amplifiers AP corresponding to the pixel columns, respectively, is controlled by activating the gate wiring line shared by the gate terminals of the cascode MOS transistors. There is no need of extending the gate wiring line in the column (vertical) direction. Therefore, the drawbacks derived from the multilayered wiring line are less likely to occur.

Figure 3:
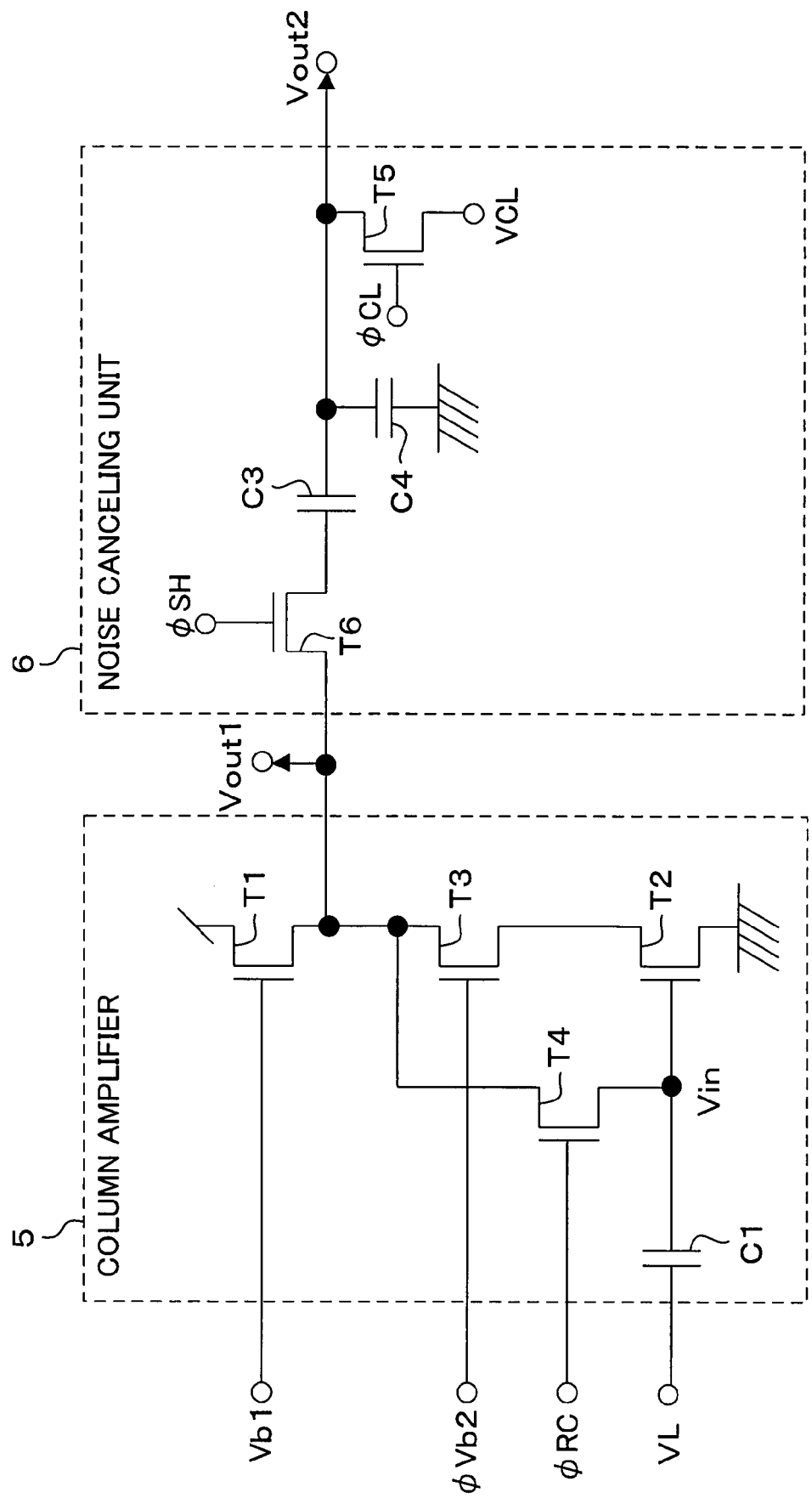
FIG. 3 is a circuit diagram illustrating a column amplifier and a noise canceling unit of a modification of the solid state imaging device of the first embodiment.

As shown in FIG. 3, the capacitor C3 may be arranged between the sample-hold MOS transistor T6 and the capacitor C4. In this case, a switch noise component of the sample-hold MOS transistor T6 held in the capacitor C4 is reduced to C3/(C3+C4).

In the solid state imaging device of the present embodiment, the timing generator 2 provided inside the solid state imaging device shown in FIG. 1 controls the timings to operate the circuits. However, the control may be achieved by a control system provided outside the solid state imaging device and inside the imaging device (digital camera or video camera).

In the present embodiment, n-channel MOS transistors are used as the column amplifier 5, the current controlling bias circuit 10 and the noise canceling unit 6 shown in FIG. 2. However, the n-channel MOS transistors may be replaced with p-channel transistors to perform the same operation.

For example, the current source MOS transistor T1 of FIG. 2 made of an n-channel transistor may be made of a p-channel transistor which functions as a current source.

The capacitor C4 provided in the noise canceling unit 6 shown in FIG. 2 is not always provided to create capacitance. It may be used as load capacitance for the wiring lines and transistors. The MOS transistors T5 and the sample-hold MOS transistors T6 are not limited to the n-channel transistors as long as they can perform the switching operation.

The noise canceling unit 6 shown in FIG. 2 is configured in the simplest manner with capacity coupling. However, the noise capacitor 6 is not limited to the circuit shown in FIG. 2 as long as the offset of the amplifiers in the pixels GS and that of the column amplifier 5 are eliminated by the capacity coupling.

The current controlling bias circuit 10 shown in FIG. 6 is described as an example and any other circuit may be used as the current controlling bias circuit 10 as long as it is capable of suitably controlling the ON/OFF switching of φb2.

Second Embodiment

Explanation of a solid state imaging device according to a second embodiment of the present invention is explained with reference to the drawings.

The timing generator 2, the vertical scanning circuit 3 and the pixel array 1 according to the second embodiment are configured in substantially the same manner as those of the first embodiment shown in FIG. 1.

That is to say, the solid state imaging device of the present embodiment includes a pixel array 1 including a plurality of pixels GS arranged in a two-dimensional matrix and capable of converting light into an electric signal. The solid state imaging device further includes a plurality of vertical signal lines VL1 to VLm, a plurality of vertical scanning lines L1 to Ln, a vertical scanning circuit 3, a column amplifier 5, a current controlling bias circuit (first control circuit) 10, a noise canceling unit 6, a horizontal readout unit 7, a horizontal scanning circuit 8, an output circuit 4 and a timing generator (control pulse generating unit) 2. The vertical signal lines VL1 to VLm are arranged to correspond to the columns of the pixels GS, respectively, and each of them is connected to the pixels in each column. The vertical scanning lines L1 to Ln are arranged to correspond to the rows of the pixels GS and the vertical scanning circuit 3 drives the vertical scanning lines L1 to Ln. The column amplifier 5 includes a plurality of amplifiers AP connected to the vertical signal lines VL1 to VLm, respectively. The current controlling bias circuit 10 controls the operation of the column amplifier 5. The noise canceling unit 6 cancels noise of output signals (image signals) from the column amplifier 5 and the horizontal readout unit 7 reads out the image signals output from the column amplifier 5. The horizontal scanning circuit 8 controls the output of the image signal from the horizontal readout unit 7 and the output circuit 4 outputs the image signal transferred from the horizontal readout unit 7 to an external circuit. The timing generator 2 controls the operation of the vertical scanning circuit 3, the current controlling bias circuit 10, the output circuit 4 and the horizontal scanning circuit 8.

FIG. 4 is a circuit diagram illustrating a column amplifier and a noise canceling unit of the solid state imaging device of the second embodiment. In FIG. 2, the MOS transistors included in the column amplifier 5 and the noise canceling unit 6 are all made of n-channel MOS (MIS) transistors.

As shown in FIG. 4, each of the amplifiers AP forming the column amplifier 5 includes an input terminal to which an image signal is input, an output terminal from which an amplified image signal is output, an amplifying MOS transistor T2 for amplifying the image signal read through the vertical signal line VL, a storage capacitor C1 arranged between a gate electrode of the amplifying MOS transistor T2 and the vertical signal line VL, a current source MOS transistor T1 serving as a current source for the column amplifier 5, a cascode MOS transistor T3 arranged between the amplifying MOS transistor T2 and the current source MOS transistor T1 and cascode-connected to the amplifying MOS transistor T2 and a reset transistor (reset circuit) T4 arranged between the input and output terminals of the column amplifier 5 to reset the operation of the column amplifier 5.

A supply voltage or a voltage higher than the supply voltage is applied to a gate terminal Vb1 of the current source MOS transistor T1.

The storage capacitor C1 is provided to eliminate an offset of the image signal read through the vertical signal line VL. This makes it possible to read out only the amplitude of the image signal to the subsequent stage.

The cascode MOS transistor T3 has the effect of improving the gain of the column amplifier 5. Just like the solid state imaging device of the first embodiment, the cascode MOS transistors T3 of the amplifiers AP forming the column amplifier 5 have gate electrodes (gate terminals) electrically connected to each other.

With this configuration, the gate wiring line for the cascode MOS transistors T3 is extended only in the row direction in the column amplifier 5. That is, there is no need of extending the gate wiring line in the column (vertical) direction. Therefore, even if the pixels in the pixel array are arranged at a finer pitch, the wiring arrangement is easily achieved. More specifically, the wiring arrangement is achieved with a larger line width and a larger gap between the wiring lines. Therefore, the need of forming multilayered wiring lines is minimized.

In order to operate the cascode MOS transistors T3 of the present embodiment, a bias voltage is applied to the gate terminals thereof as φVb2. When a LOW voltage is applied to the gate terminals as φVb2, the cascode MOS transistors T3 are turned OFF and the current flow to the cascode MOS transistors T3 is stopped. Thus, the amount of current consumed by all the amplifiers AP in the column amplifier 5 is controlled by turning the cascode MOS transistors T3 OFF. To be more specific, since the gate terminals of the cascode MOS transistors T3 corresponding to the pixel columns, respectively, are connected to the shared wiring line, the current consumed by all the amplifiers AP is controlled simultaneously with a single current controlling drive pulse.

The solid state imaging device of the second embodiment is different from that of the first embodiment in that the column amplifier 5 includes a feedback capacitor C2 for determining the gain thereof. Referring to FIG. 4, the feedback capacitor C2 is arranged on a line connecting a node between the storage capacitor C1 and the gate electrode of the amplifying MOS transistor T2 and a node between the drain of the cascode MOS transistor T2 and the source of the current source MOS transistor T1.

With this configuration, the gain of the column amplifier 5 obtained by C1/C2 is made smaller than the open loop gain of the column amplifier 5. That is to say, the gain of the column amplifier 5 is determined by C1/C2. Therefore, the gain value is easily controlled by changing the capacity ratio C1/C2.

According to the present embodiment, even if the gain value determined by C1/C2 is close to the open loop gain, the electrical characteristics of the cascode MOS transistors T3 are stabilized by operating the cascode MOS transistors T3 in a strong conversion state. As a result, the gain variation among the amplifiers AP is reduced and the gain of the column amplifier 5 becomes high. The stabilization of the electrical characteristics of the cascode MOS transistors T3 is to stabilize the ON resistance of the cascode MOS transistors T3.

Just like the first embodiment described above, the present embodiment gives the effect of reducing the current consumption by the column amplifier 5 and the effect of removing the offset contained in the signal output from the column amplifier 5 by the noise canceling unit 6.

Figure 5:
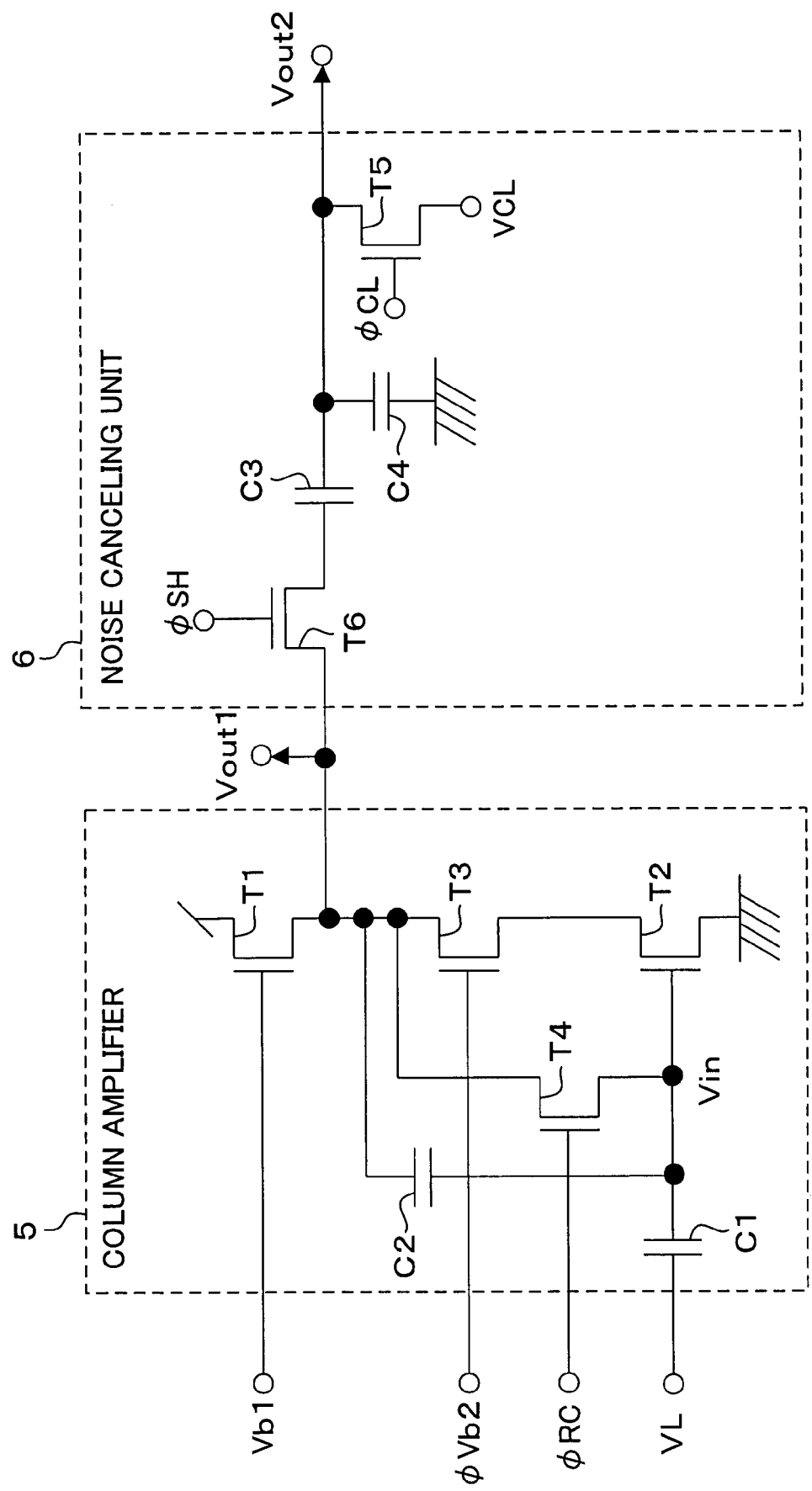
FIG. 5 is a circuit diagram illustrating a column amplifier and a noise canceling unit of a modification of the solid state imaging device of the second embodiment.

As shown in FIG. 5, the capacitor C3 may be arranged between the sample-hold MOS transistor T6 and the capacitor C4. In this case, a switch noise component of the sample-hold MOS transistor T6 held in the capacitor C4 is reduced to C3/(C3+C4).

In the present embodiment, the timing generator 2 provided inside the solid state imaging device shown in FIG. 1 controls the timings to operate the circuits. However, the control may be performed by a system arranged outside the solid state imaging device.

In the present embodiment, n-channel MOS transistors shown in FIG. 4 are used as the column amplifier 5. However, the n-channel MOS transistors may be replaced with p-channel transistors to perform the same operation.

For example, the current source MOS transistor T1 of FIG. 4 made of an n-channel transistor may be made of a p-channel transistor which functions as a current source.

The capacitor C4 provided in the noise canceling unit 6 shown in FIG. 4 is not always provided to create capacitance. It may be used as load capacitance for the wiring lines and transistors. The MOS transistors T5 and the sample-hold MOS transistors T6 are not limited to the n-channel transistors as long as they can perform the switching operation.

The noise canceling unit 6 shown in FIG. 4 is configured in the simplest manner with capacity coupling. However, the noise canceling unit 6 is not limited to the circuit shown in FIG. 4 as long as the offset of the amplifiers in the pixel GS and that of the column amplifier 5 are eliminated by the capacity coupling.

The current controlling bias circuit 10 shown in FIG. 6 is described as an example and any other circuit may be used as the current controlling bias circuit 10 as long as it is capable of suitably controlling the ON/OFF switching of φVb2.

If the column amplifier 5 is configured as shown in FIG. 4 such that the gain depends on the capacity ratio and the gain determined by the capacity ratio is set lower than the open loop gain, the gain of the column amplifier 5 is determined by the capacity ratio. The column amplifier 5 shown in FIG. 4 makes it possible to arrange the pixels at a finer pitch as described above. Further, since the cascode MOS transistors T3 are operated in a strong conversion state, characteristic variations are suppressed more than the case where the cascode MOS transistors T3 are operated in a weak inversion region as a result, the gains of the amplifiers AP in the column amplifier 5 corresponding to the pixel columns, respectively, are made uniform, thereby preventing the degradation of image quality such as the occurrence of vertical lines.

Thus, as described above, the solid state imaging device of the present invention is useful as an imaging device such as digital cameras and video cameras.

What is claimed is:

1. A solid state imaging device comprising: a plurality of pixels arranged in a two-dimensional matrix; a plurality of vertical signal lines arranged to correspond to columns of the pixels, respectively, each of which being connected to the pixels in each column, a plurality of amplifiers arranged to correspond to the vertical signal lines, respectively, each of which including a current source MOS transistor, an amplifying MOS transistor for amplifying image signals output from the pixels to one of the vertical signal lines and a cascode MOS transistor which is cascode-connected to the amplifying MOS transistor between the current source MOS transistor and the amplifying MOS transistor and outputs the amplified image signals between the cascode MOS transistor and the current source MOS transistor, wherein gate terminals of the cascade MOS transistors of the plurality of amplifiers are connected to each other wherein in each of the amplifiers, the current source MOS transistor has a drain connected to a power source or ground and a source connected to a drain of the cascade MOS transistor and an output terminal of the amplifier, the cascode MOS transistor has a source connected to a drain of the amplifying MOS transistor and the amplifying MOS transistor has a source connected to ground or the power source and a gate connected to an input terminal of the amplifier.

2. The solid state imaging device of claim 1, wherein each of the amplifiers further includes a reset circuit arranged between the input and output terminals thereof to reset the operation of the amplifier.

3. The solid state imaging device of claim 1 further comprising a first control circuit for controlling the operation of the cascode MOS transistors.

4. The solid state imaging device of claim 3 further comprising a control pulse generating unit for supplying a control pulse to the first control circuit.

5. The solid state imaging device of claim 4, wherein the control pulse generating unit sets a horizontal scanning period comprising a horizontal blanking period and a horizontal readout period, the amplifiers are operated by the first control circuit during the horizontal blanking period and stopped by the first control circuit at least on the termination of the horizontal blanking period.

6. The solid state imaging device of claim 3, wherein the first control circuit operates the cascode MOS transistors in a strong inversion region at least for a period over which the reset circuit executes the reset operation.

7. The solid state imaging device of claim 6, wherein the amplifying MOS transistors are n-channel transistors and a gate voltage of the cascode MOS transistors is higher than a gate voltage of the amplifying MOS transistors when the amplifiers are reset.

8. The solid state imaging device of claim 7, wherein the reset circuits, the current source MOS transistors and the cascode MOS transistors are n-channel MOS transistors.

9. The solid state imaging device of claim 6, wherein the amplifying MOS transistors are p-channel transistors and a gate voltage of the cascode MOS transistors is lower than a gate voltage of the amplifying MOS transistors when the amplifiers are reset.

10. The solid state imaging device of claim 3, wherein the first control circuit terminates the operation of the amplifiers by deactivating the cascode MOS transistors for a predetermined period.

11. The solid state imaging device of claim 1, wherein each of the amplifiers further includes a first capacitor arranged between the vertical signal line and a gate terminal of the amplifying MOS transistor.

12. The solid state imaging device of claim 11, wherein each of the amplifiers further includes a second capacitor arranged between the first capacitor and the output terminal of the amplifier.

13. The solid state imaging device of claim 1 further comprising noise canceling units for canceling variations in output voltage of the amplifiers when the amplifiers are reset, each of the noise canceling units having a first capacitor for receiving the output of the corresponding amplifier.

14. The solid state imaging device of claim 13, wherein each of the noise canceling units further includes a second capacitor for holding an output signal of the corresponding amplifier from which the voltage variation has been canceled and a MOS transistor for clamping an end of the second capacitor to a reference bias potential and the first capacitor clamps the output signal of the corresponding amplifier together with the MOS transistor.

15. The solid state imaging device of claim 14, wherein each of the noise canceling units further includes a sample-hold MOS transistor arranged between the first and second capacitors to let the second capacitor hold the output signal.

16. The solid state imaging device of claim 14, wherein each of the noise canceling units further includes a sample-hold MOS transistor arranged between the first capacitor and the output terminal of the amplifier to let the second capacitor hold the output signal.

17. The solid state imaging device of claim 15 further comprising a second control circuit for generating a first pulse for controlling the operation of the MOS transistors and a second pulse for controlling the operation of the sample-hold MOS transistors.

18. An imaging device comprising: a plurality of pixels arranged in a two-dimensional matrix and receive light; a plurality of vertical signal lines arranged to correspond to columns of the pixels, respectively, each of which being connected to the pixels in each column, a plurality of amplifiers arranged to correspond to the vertical signal lines, respectively, each of which including a current source MOS transistor, an amplifying MOS transistor for amplifying image signals output from the pixels to one of the vertical signal lines and a cascode MOS transistor which is cascode-connected to the amplifying MOS transistor between the current source MOS transistor and the amplifying MOS transistor and outputs the amplified image signals between the cascode MOS transistor and the current source MOS transistor, wherein gate terminals of the cascode MOS transistors of the plurality of amplifiers are connected to each other wherein in each of the amplifiers, the current source MOS transistor has a drain connected to a power source or ground and a source connected to a drain of the cascode MOS transistor and an output terminal of the amplifier, the cascode MOS transistor has a source connected to a drain of the amplifying MOS transistor and the amplifying MOS transistor has a source connected to ground or the power source and a gate connected to an input terminal of the amplifier.

19. The imaging device of claim 18 further comprising a first control circuit for controlling the operation of the cascode MOS transistors.

20. The imaging device of claim 19 further comprising a control pulse generating unit for supplying a control pulse to the first control circuit.

21. The imaging device of claim 20, wherein the control pulse generating unit sets a horizontal scanning period comprising a horizontal blanking period and a horizontal readout period, the amplifiers are operated by the first control circuit during the horizontal blanking period and stopped by the first control circuit at least on the termination of the horizontal blanking period.

22. The imaging device of claim 20, wherein the control pulse generating unit determines that a timing at which the amplifiers are stopped comes before the start of the horizontal blanking period and a timing at which the amplifiers are actuated comes after the end of the horizontal blanking period.

23. The imaging device of claim 19, wherein the solid state imaging device further comprises noise canceling units for canceling variations in output voltage of the amplifiers when the amplifiers are reset, each of the noise canceling units having a first capacitor for receiving the output of the corresponding amplifier, a second capacitor for holding the output of the corresponding amplifier, a MOS transistor for clamping an end of the second capacitor to a reference bias potential and a sample-hold MOS transistor arranged between the first and second capacitors to let the second capacitor hold the output signal and the imaging device further comprises a second control circuit for generating a control pulse for the MOS transistors and a third control circuit for generating a control pulse for the sample-hold MOS transistors.

* * * * *